(12) United States Patent
Sillankorva et al.

(10) Patent No.: US 11,522,840 B2
(45) Date of Patent: Dec. 6, 2022

(54) AUTOMATIC CLIENT DEVICE REGISTRATION

(71) Applicant: Arm Limited, Cambridge (GB)

(72) Inventors: Simo Mikael Sillankorva, Oulu (FI); Markku Lehto, Oulu (FI); Kalle Petteri Vayrynen, Oulu (FI); Jaakko Iiro Juhani Kukkohovi, Oulu (FI); Szymon Sasin, Oulu (FI); Yongbeom Pak, Oulu (FI)

(73) Assignee: Arm Limited, Cambridge (GB)

( * ) Notice: Subject to any disclaimer, the term of this patent is extended or adjusted under 35 U.S.C. 154(b) by 232 days.

(21) Appl. No.: 16/443,054

(22) Filed: Jun. 17, 2019

(65) Prior Publication Data
US 2019/0394174 A1    Dec. 26, 2019

(30) Foreign Application Priority Data

Jun. 26, 2018   (GB) ..................... 1810472

(51) Int. Cl.
| | | |
|---|---|---|
| *H04L 9/40* | (2022.01) | |
| *G06F 1/32* | (2019.01) | |
| *H04L 9/06* | (2006.01) | |
| *H04L 9/32* | (2006.01) | |

(52) U.S. Cl.
CPC ............ *H04L 63/0435* (2013.01); *G06F 1/32* (2013.01); *H04L 9/0643* (2013.01); *H04L 9/3268* (2013.01); *H04L 63/061* (2013.01); *H04L 63/166* (2013.01)

(58) Field of Classification Search
CPC .  H04L 63/0435; H04L 9/0643; H04L 9/3268; H04L 63/061; H04L 63/166; H04L 63/0823; H04L 63/123; H04L 63/0428; H04L 67/141; H04L 67/12; H04L 9/3263; H04L 41/08; H04L 63/0876; H04L 63/205; H04L 67/145; H04L 67/34; H04L 67/42; H04L 69/28; G06F 1/32; G06F 1/3209; H04W 12/065; H04W 4/70
See application file for complete search history.

(56) References Cited

U.S. PATENT DOCUMENTS

| | | | |
|---|---|---|---|
| 6,871,276 B1* | 3/2005 | Simon ................... | H04L 63/126 713/180 |
| 2015/0009813 A1* | 1/2015 | Nguyen ............ | H04W 28/0215 370/329 |
| 2016/0226828 A1* | 8/2016 | Bone ........................ | H04L 63/10 |
| 2016/0234183 A1* | 8/2016 | Bone ...................... | H04W 88/02 |
| 2018/0205720 A1* | 7/2018 | Westerlund ......... | H04L 63/0876 |
| 2019/0007836 A1* | 1/2019 | Ocak .................. | H04W 12/0431 |
| 2019/0238536 A1* | 8/2019 | Chilla ................. | H04L 63/0823 |

FOREIGN PATENT DOCUMENTS

WO    2017131564 A1    8/2017

* cited by examiner

*Primary Examiner* — Mohammed Waliullah
(74) *Attorney, Agent, or Firm* — Leveque Intellectual Property Law, P.C.

(57) ABSTRACT

Broadly speaking, the present technique provides methods, apparatuses and systems for performing a TLS/DTLS handshake process between machines in a manner that reduces the amount of data sent during the handshake process.

13 Claims, 5 Drawing Sheets

Server and Device Handshake

AUTOMATIC CLIENT DEVICE REGISTRATION

TECHNICAL FIELD

The present techniques generally relate to methods, apparatuses and systems for maintaining a client device registration with a server.

BACKGROUND

There are ever increasing numbers of devices within the home, other buildings, vehicles and the outdoor environment, as well as personal devices, which have the processing and communication capabilities to enable them to communicate with other devices (e.g. end-point/client devices, servers, etc.) within the same network or in a different network to access services as part of the "Internet of Things" (IoT).

For example, a temperature device in the home may gather sensed data and push the sensed data to a remote service (such as an application running in 'the cloud'). The temperature device may then be controlled remotely by the remote service via received command data. In other examples, a factory pollution monitoring sensor may gather information from various chemical sensors and arrange maintenance based on the gathered information; whilst a healthcare provider may use wireless sensors, such as a heart rate monitor to track the health of patients while they are at home. Such devices are used in a range of networks, whereby the data is generally transmitted between devices and/or services using machine-to-machine (M2M) communication techniques.

M2M communication techniques typically need to be secure, for example, because sensitive data may be transmitted between devices to servers, and/or because unsecure communication may enable malicious third parties to gain access to the machines or to the data being transmitted between machines. M2M communications may be secured using cryptographic protocols, such as the Transport Layer Security (TLS) protocol or the Datagram Transport Layer Security (DTLS) protocol, which are designed to prevent eavesdropping, tampering or message/data forgery. The TLS/DTLS protocol requires machines that seek to communicate with each other (e.g. end-point/client devices and servers) to authenticate each other by exchanging and validating digital certificates in a handshake process.

In many systems, end-point devices/client devices may connect to and communicate with one or more servers. For example, a client device which functions to monitor temperature of an environment may need to transmit temperature data to a server regularly/periodically. A server may maintain a client device registration directory to record the client devices that have registered to connect to/communicate with the server. However, some client devices (such as those used in an Internet of Things system) may be constrained resource devices, i.e. they may be low-power, low-memory and/or low-processing power devices. Such constrained resource devices may have intermittent connectivity with a network in which they are operational, and in particular, with a server in the network. Accordingly, some client devices may not be continuously connected to the server with which they have registered. The client devices may need to communicate with the server to maintain their registration so that they can continue to connect to the server.

BRIEF DESCRIPTION OF THE DRAWINGS

The techniques are diagrammatically illustrated, by way of example, in the accompanying drawings, in which.

DETAILED DISCLOSURE

Figure 1:
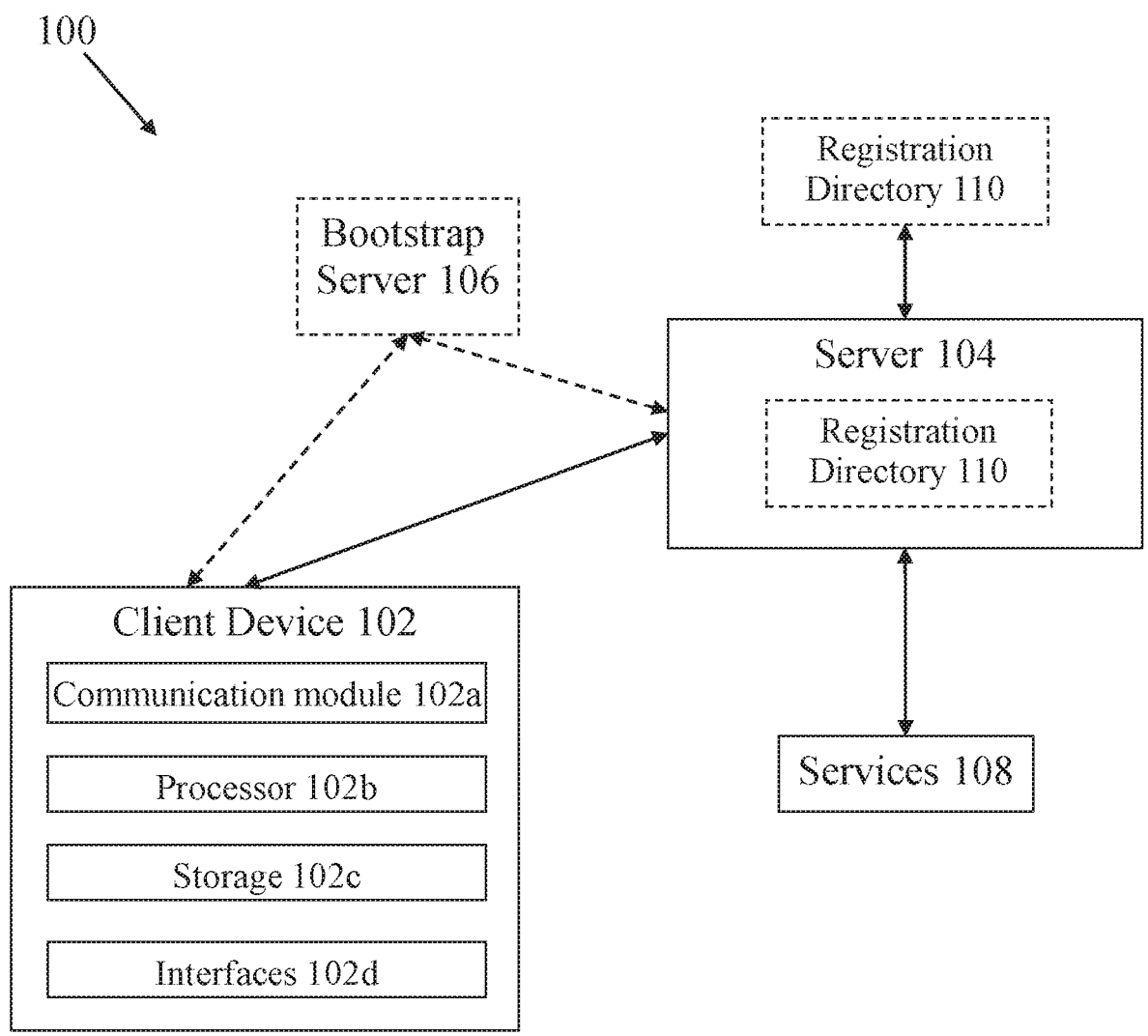
FIG. 1 shows a block diagram of a system comprising a client device and a server.

The present applicant has recognised the need for a technique for maintaining client device registration with a server.

In a first aspect of present techniques, there is provided a method for maintaining registration of a client device with a Lightweight Machine-to-Machine (LwM2M) server, the method performed by the client device comprising:

establishing a secure communication session with the LwM2M server comprising performing a Transport Layer Security (TLS) or Datagram Transport Layer security (DTLS) handshake with the LwM2M server;

receiving a registration confirmation message from the LwM2M server confirming that the client device has been added to a client registration directory, the registration having a defined lifetime;

performing, before expiry of the defined lifetime, a further TLS or DTLS handshake with the LwM2M server, wherein the further TLS or DTLS handshake comprising client data is used to identify the client device so as to maintain registration of the client device within the client registration directory.

In a second aspect of present techniques, there is provided a client device comprising: communication circuitry for: establishing a secure communication session with a Lightweight Machine-to-Machine (LwM2M) server, comprising performing a Transport Layer Security (TLS) or Datagram Transport Layer Security (DTLS) handshake with the LwM2M server; receiving a registration confirmation message from the LwM2M server confirming that the client device has been added to a client registration directory, the registration having a defined lifetime; and performing, before expiry of the defined lifetime, a further TLS or DTLS handshake with the LwM2M server, wherein the further TLS of DTLS handshake comprising client data is used to identify the client device within the client registration directory and to maintain registration of the client device within the client registration directory.

In a third aspect of present techniques, there is provided a method for maintaining registration of a client device with a Lightweight Machine-to-Machine (LwM2M) server, the method performed by the server comprising: establishing a secure communication session with the client device comprising performing a Transport Layer Security (TLS) or Datagram Transport Layer Security (DTLS) handshake with the client device; receiving, following the establishment of the secure communication session, a registration message from the client device, transmitting a registration confirmation message to the client device confirming that the client device has been added to a client registration directory, the registration having a defined lifetime; performing, before expiry of the defined lifetime, a further TLS or DTLS handshake with the LwM2M server, wherein the further TLS or DTLS handshake comprising client data is used to identify the client device so as to maintain the registration of the client device within the client registration directory.

In a fourth aspect of present techniques, there is provided a Lightweight Machine-to-Machine (LwM2M) server comprising: at least one processor coupled to communication circuitry for: establishing a secure communication session with a client device comprising performing a Transport Layer Security (TLS) or Datagram Transport Layer security (DTLS) handshake with the client device; transmitting a registration confirmation message to the client device confirming that the client device has been added to a client registration directory, the registration having a defined lifetime; performing, before expiry of the defined lifetime, a further TLS or DTLS handshake, wherein the further TLS or DTLS handshake comprising client data is used to identify the client device so as to maintain the registration of the client device within the client registration directory.

A related approach of the present techniques provides a system comprising a plurality of client devices of the type described herein and at least one server of the type described herein.

A further approach of the present techniques provides a non-transitory computer-readable medium storing instructions which, when implemented on a processor, cause the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Broadly speaking, embodiments of the present technique provide methods, apparatuses and systems for a more efficient technique for maintaining a client device registration with a server, which reduces the number of messages that need to be sent for the registration to be maintained. For client devices which are constrained devices (e.g. low-power, low-memory and/or low-processing power devices), the technique described herein may be useful because the technique may reduce the amount of power consumed by the devices to send and receive messages and may reduce how long the device is an 'awake' mode.

The term "client device" is used interchangeably herein with the terms "Internet of Things device", "IoT device", "node device", "node", "endpoint device", "endpoint", "client", and "constrained resource device".

As mentioned briefly above, machine to machine (M2M) communication techniques typically need to be secure to reduce the risk that malicious third parties gain access to the machines, or to limit the access of each machine to particular data, machines or services. M2M communications may be secured using cryptographic protocols, such as the Transport Layer Security (TLS) protocol or the Datagram Transport Layer Security (DTLS) protocol, which are designed to prevent eavesdropping, tampering or message/data forgery. The TLS and DTLS protocols require machines that seek to communicate with each other (e.g. client devices and servers) to authenticate each other by exchanging and validating digital certificates in a handshake process, before any other communication/message exchange can begin.

The TLS/DTLS protocol may be used to secure communication between an Internet of Things (IoT) device (i.e. a client device) and a remote or cloud-based server, for example. In this case, during the handshake process, the client device and server exchange their public key certificates (also known as, and referred to herein, as digital certificates or identity certificates). Digital certificates are electronic documents used to prove the ownership of a public key that is used as part of an asymmetric key algorithm (i.e. which forms part of a public-private key pair). A digital certificate typically comprises information about the public key, information about the identity of its owner (e.g. the client device or server), and the digital signature of an issuing entity that has verified the contents of the certificate (e.g. a trusted third party such as a certificate authority). A digital certificate can be large, particularly if it comprises a certificate chain, or if each certificate is an RSA certificate (i.e. where a public key is based on two large prime numbers). For example, a single RSA-based certificate containing a 2048-bit key may be at least 1024 bytes in size. Similarly, at least the first time a TLS/DTLS handshake is performed between a client device and a server, the client device and server need to decide on which cryptographic algorithm(s) or ciphers or cipher suites they will use to secure communication sessions. For example, the client device may send a list of cipher suites that it supports, potentially in order of preference. The server selects a cipher suite from the list and informs the client device of this selection. The list of cipher suites may be large, which increases the amount of information sent between machines during a TLS/DTLS handshake. This means that every time a client device and a server perform a handshake process to begin a secure communication session (i.e. a session during which the client device and server exchange encrypted messages), large amounts of data may need to be exchanged.

The exchange of certificates in a handshake process may be problematic in an Internet of Things environment in which client devices or end-user devices tend to be low-power, low-memory, and/or low-processing power devices. Client devices/end-user devices may have intermittent connectivity with a network in which they are operational, or with an external network, or other devices within a network. For example, client devices may not have good or continuous connectivity with the other devices/machines or the Internet, because this may consume resources of the client devices (e.g. power or memory). Some client devices may switch into a sleep mode to conserve power when they do not need to connect to or communicate with other devices/machines/servers in the network. This means that each time a client device needs to communicate with a server, the handshake process needs to be performed again to establish a secure communication session. Performing a handshake process, and in particular, exchanging certificates in a TLS/DTLS handshake process, may be problematic for constrained resource devices, but this is unavoidable if secure communications are required.

As mentioned above, in many systems, client devices may connect to and communicate with one or more servers. A server may maintain a client device registration directory to keep a record of the client devices that have registered to connect to/communicate with the server. However, constrained resource devices may have intermittent connectivity with a network in which they are operational, and in particular, with a server in the network. Accordingly, some client devices may not be continuously connected to the server with which they have registered. The client devices may need to, from time to time, communicate with the server to maintain their registration so that they can continue to connect to the server whenever they need to send data to, or receive data from, the server.

Before expiry of the lifetime of the registration, present techniques provide for a further TLS or DTLS handshake with the LwM2M server, the further TLS or DTLS handshake comprising client data used to identify the client device so as to maintain registration of the client device within the directory of the LwM2M server.

In embodiments, client data is data that can be used to identify the client device at the LwM2M server. In such a way, the LwM2M server can infer information about the identify of the client device from the further TLS or DTLS handshake.

In embodiments, the client data may be a client device identifier and information about the client device may be contained within the handshake message or within a client device certificate or an identifier extracted from the certificate or extracted from a Client Hello message. Client data may also comprise a Pre-Shared Key, or a Session ID or Session Ticket.

Accordingly, in techniques the further TLS or DTLS handshake process used to identify the client device from client data may comprise one or more of the following handshake example cases:

A TLS or DTLS handshake where a certificate is sent in a certificate message and the client certificate is used to identify which client device registration to maintain.

A TLS or DTLS handshake where a pre-shared key is sent in a Client Hello message, the pre-shared key being used to identify which client device registration to maintain.

A TLS or DTLS handshake where using information in a Client Hello message comprises using a client device identifier in a certificate to locate a client device entry within a client registration directory.

A TLS or DTLS handshake using session resumption with Session ID or Session Ticket sent in a Client Hello message, where the Session ID or Session Ticket is used to identify which client device registration to maintain.

The Constrained Application Protocol (CoAP) is a communication protocol specifically designed for use by constrained nodes and constrained networks (c.f. https://tools.ietf.org/html/rfc7252). It is typically used by IoT devices and IoT networks, for machine-to-machine communications, because the protocol has low overhead, is suitable for multicasting, and has a simplicity that makes it suitable for constrained networks. The OMA Lightweight Machine to Machine (OMA LwM2M) protocol is an application layer communication protocol designed for machine-to-machine and IoT device management. OMA LwM2M is used for communication between client devices and servers, where the client devices may be constrained resource devices, and may be used for bootstrapping, client device registration with a server, device management and information reporting, for example. OMA LwM2M is often used alongside CoAP and TLS/DTLS.

Typically, a client device is required to register with a server in order for the server to know that the client device is in its network, and for the client device to be able to communicate with the server. When a client device registers with a server, it may also provide the server with information about the resources of the client device and any information that will enable the client device to be identified by the server (e.g. endpoint name). The client device may also provide the server with information to maintain the registration, such as a registration lifetime. The registration lifetime defines the duration of the registration with the server, and is defined by the client device. The lifetime could be short (e.g. a few hours) or could be longer (e.g. a day or several days), and may be defined by the client device based on the device properties. For example, if a client device is a constrained resource device that will be in a sleep mode to conserve resources for long periods of time, then the lifetime may be long (e.g. a day or more). The client device may be required to periodically update its registration information with the or each server that it registered with. Typically, the client device may be required to send an update message or perform an update operation within the registration lifetime. The update message may contain new information about the client device, such as a new lifetime or new information about its resources. Alternatively, the update message may not contain any parameters—this is typically used if the client device simply wishes to maintain its registration with the server. If the server does not receive an update message from a client device within the lifetime set by the client device, then the server removes the client device from the client device registration directory.

However, each time the client device performs the update operation to maintain its registration with the server, the client device may exchange several messages with the server. If the client device disconnected from the server after the initial registration process, then the client device and server first need to establish a new secure communication session before the update operation can begin. This may be the case if the client device is a constrained resource device because the client device will likely have entered a sleep mode or low power mode to conserve resources when it did not need to communicate with the server, and therefore, a previous secure communication session would have ended/terminated. Therefore, the client device and server perform another handshake process to establish a secure communication session (e.g. by exchanging certificates in a TLS/DTLS handshake process). Once the secure communication session has been established, the client device sends a CoAP update message (e.g. a CoAP POST message) to the server. The CoAP message contains information to identify the client device, so that the server with which the client device is registered is able to locate the client device within the client device registration directory. The CoAP message may contain client device parameters that have changed and need to be updated within the registration directory, or may not contain any parameters. If the server receives the CoAP message within the original lifetime, then the server proceeds to perform an update of the registration directory for the client device. If the CoAP message does not contain any parameters, the server determines that the registration lifetime of the client device is simply to be reset/restarted. Once the server has completed the update process, the server sends a CoAP message back to the client device to confirm that the update has been completed (e.g. the message contains 2.04 (changed) response code).

The present applicant has identified that this process to maintain the registration of a client device with a server contains redundant messages, and consequently, results in communications that unnecessarily consume resources (e.g. power, memory, processing power, etc.) of constrained resource client devices. Therefore, the present techniques provide a simplified and more efficient way to maintain registration of a client device with a server.

As described above, in the case where the client device simply wishes to inform the server that it is still "alive" or operational, and still wishes to communicate with the server, the CoAP message sent by the client device does not contain any parameters. This causes the server to refresh the client device registration within the registration directory, e.g. by restarting the registration lifetime. However, at least two CoAP messages are exchanged between the client device and server for this to occur. The present techniques remove the need to exchange these CoAP messages for registration maintenance. Instead, the present techniques use the fact that a new secure communication session is established between the client device and server as a trigger to maintain the registration. Thus, the present techniques reduce the number of messages that are exchanged for the update operation. The present techniques may reduce the amount of time a client device is in an "awake mode", because the client device may switch into a low power or "sleep mode" as soon as the secure communication session is established, as no further messages need to be sent or received by the client device. The amount of processing performed by the client device (and therefore, the amount of memory and power used by the client device) may also be reduced by reducing the number of messages that are exchanged for the update operation. The optimised registration update process of the present techniques is described in more detail below with reference to the Figures.

FIG. 1 shows a block diagram of a system 100 comprising a client device 102 and a server 104 which may securely communicate with each other. The system 100 may, in embodiments, comprise a bootstrap server 106. The system 100 may comprise multiple client devices and/or multiple servers, but only a single client device and a single server is shown for the sake of simplicity. As mentioned above, client device 102 may also be referred to herein as a "device", "client", "node device", "node", "end-user device", "user device", "Internet of Things device", "IoT device", "endpoint device", "endpoint", and "constrained resource device". The client device 102 may be a computer (e.g. a PC), a laptop, a tablet computer, a mobile phone, a 'smart object' or Internet of Things object. In embodiments, the client device 102 may be a device which is able to turn electronic objects into 'smart objects' that may form part of the Internet of Things, such as smart streetlights, electricity meters, temperature sensors, etc. It will be appreciated that these are merely example smart objects provided for illustrative purposes, and are non-limiting.

Each client device 102 may require access to one or more services 108 that are accessed via server 104. Each client device 102 comprises a communication module 102a, to enable the client device 102 to communicate with other machines, such as bootstrap server 106 or server 104, or with other client devices. Typically, the other machines are located remote to the client device 102. The communication module 102a may be any suitable communication module, comprising any suitable communication circuitry and using any suitable communication protocols, to transmit and receive messages (or data or data packets). The communication module 102a may use any suitable communication protocol to communicate with other machines, such as, but not limited to, wireless communication (e.g. WiFi), short range communication such as radio frequency communication (RFID) or near-field communication (NFC), or by using the communication protocols specified by ZigBee, Thread, Bluetooth, Bluetooth LE, IPv6 over Low Power Wireless Standard (6LoWPAN), Constrained Application Protocol (CoAP), or CoAP over TCP, TLS and WebSockets. The communication module 102a may use a wireless mobile (cellular) telecommunication protocol to communicate with remote machines, e.g. 3G, 4G, 5G, etc. The client device 102 may communicate with remote machines using wired communication techniques, such as via metal cables or fibre optic cables. The client device 102 may use more than one communication technique to communicate with remote machines.

The client device 102 comprises a processor or processing circuitry 102b. Processor 102b controls various processing operations performed by client device 102, such as verifying a digital certificate and authenticating a machine which attempts to communicate with client device 102. The processor 102b may comprise processing logic to process data (e.g. data signals and data packets received from other machines within system 100), and generate output data in response to the processing. The processor 102b may comprise one or more of: a microprocessor, a microcontroller, and an integrated circuit.

Client device 102 comprises storage 102c. Storage 102c may comprise a volatile memory, such as random access memory (RAM), for use as temporary memory, and/or non-volatile memory such as Flash, read-only memory (ROM), or electrically erasable programmable ROM (EEPROM), for storing data, programs or instructions. Storage 102c may store credentials that are provided during the manufacturing process to fabricate client device 102, such as a digital certificate for the client device 102 (which comprises information about the client device's public key), also referred to herein as Cert(C), and a private key of a public-private key pair, also referred to herein as Priv(C). Storage 102c may be used to store additional keys and digital certificates, as well as information used to verify/authenticate server 104. Storage 102c may be used to store information that can be used to identify the client device 102, such as an endpoint name or security credentials that are unique to the client device 102. The endpoint name may be specified by a manufacturer, or may be specified during a bootstrapping process (such that a unique endpoint name is created and provided to the client device 102 during a bootstrapping provisioning process, e.g. by the bootstrap server 106), or may be specified during a handshake process (e.g. a TLS/DTLS handshake process). The endpoint name may be globally unique to the client device 102. Alternatively, the endpoint name may be locally unique, such that it is unique to a particular account or user associated with the client device. In this case, the endpoint name and account/user may be required to identify the client device 102.

Client device 102 may comprise one or more interfaces 102d that enable the device 102 to receive inputs (e.g. sensed/measured data), and/or generate outputs (e.g. audio and/or visual outputs, or control commands, etc.)

Client device 102 may communicate with server 104 using appropriate communication standards/protocols. It will be understood that intermediary devices (such as a gateway) may be located between device 102 and sever 104, to facilitate communication between the machines.

Client device 102 may, in embodiments, be an Internet of Things (IoT) device or a constrained resource device. Server 104 may be a lightweight machine-to-machine server (LWM2M server), such that the server 104 and client device 102 communicate using the Open Mobile Alliance (OMA) LWM2M protocol, or other LWM2M protocol. Server 104 may be an OMA Device Management (DM) server, such that the server 104 and client device 102 communicate using the OMA DM communication protocol. Server 104 may be a TR-069 server (which is a bidirectional SOAP/HTTP-based protocol), such that server 104 and client device 102 communicate using the CPE WAN Management protocol (CWMP) published by the Broadband Forum. Server 104 may be a server which follows a standard/protocol set by the Open Connectivity Foundation or Open Interconnect Consortium.

Server 104 may communicate with services 108 which may, for example, be part of a private cloud or public cloud environment or on the internet, or which may be hosted on server 104. The services 108 may provide different types of services such as data storage, data analytics, data management, application services, etc. It will be understood these listed services are merely examples and are non-limiting.

System 100 comprises a registration directory 110. The registration directory 110 may be located within server 104, or may be external to server 104, as shown in FIG. 1. In either case, the server 104 communicates with the registration directory 110 to maintain a register of each client device 102 which has registered with the server 104. The server 104 may be configured to receive registrations from client devices that are, continuously or non-continuously, operationally connected to the server 104. The client devices 102 and their resources, along with other information, are registered with the registration directory 110. Thus, the registration directory 110 may be considered a registry of the resources below the server 104 in the machine-to-machine network. This eliminates the need for management tools or otherwise to probe/query the network to determine which resources/devices are present in the network. The registration directory 110 may be provided by a processor and storage. The registration directory 110 may be realised as a database application, for example. Client devices 102 which are communicatively coupled to the server 104 send a registration request to the server 104, and the server 104 creates an entry for the client device 102 within the registration directory 110. The entry within the registration directory 110 comprises information to enable the server 104 to identify the client device 102, such that subsequent messages received from the client device 102 can be readily attributed to the correct registered device.

Client device 102 and server 104 may communicate with bootstrap server 106. In embodiments, server 106 may be any type of server or remote machine, and may not necessarily be a dedicated bootstrap server. Generally speaking the bootstrap server 106 is any means (e.g. machine, hardware, technology, server, software, etc.) which may be able to provide data to client device 102 and/or server 104 (e.g. may be able to provide credentials). In embodiments, server 104 may be a bootstrap server. Bootstrap server 106 may be used to provision client device 102 with the required information to enable client device 102 to undertake a TLS/DTLS handshake process with server 104. Bootstrap server 106 may comprise a database of all machines which are registered with the bootstrap server, together with information on the permissions/access any particular machine should have, and which details a machine has, and may require, to communicate with other machines. In embodiments, bootstrap server 106 may not be required to provision client device 102 with any required credentials—instead, these provisioning may occur during a manufacturing process or during a handshake process.

In embodiments, the client device 102 may be a constrained resource device which uses a lightweight machine-to-machine protocol (LWM2M) to communicate with other machines. Server 104 may be an LWM2M server. LWM2M protocols may utilise bootstrapping techniques to provision the client device 102 with required information, e.g. credentials for TLS/DTLS handshakes. The bootstrapping techniques may comprise a 'factory bootstrap', in which information (e.g. credentials) is hardcoded into the client device 102 during manufacture. The factory bootstrap may comprise adding one or more credentials required by client device 102 to communicate with other devices (e.g. server 104), or may comprise adding the information required for client device 102 to reach a bootstrap server (which may provide any missing information required by the client device 102 to communicate with other devices). It will be understood that any suitable technique to provision the client device 102 with credentials may be used instead of, or in addition to, the provisioning techniques mentioned herein.

Figure 2:
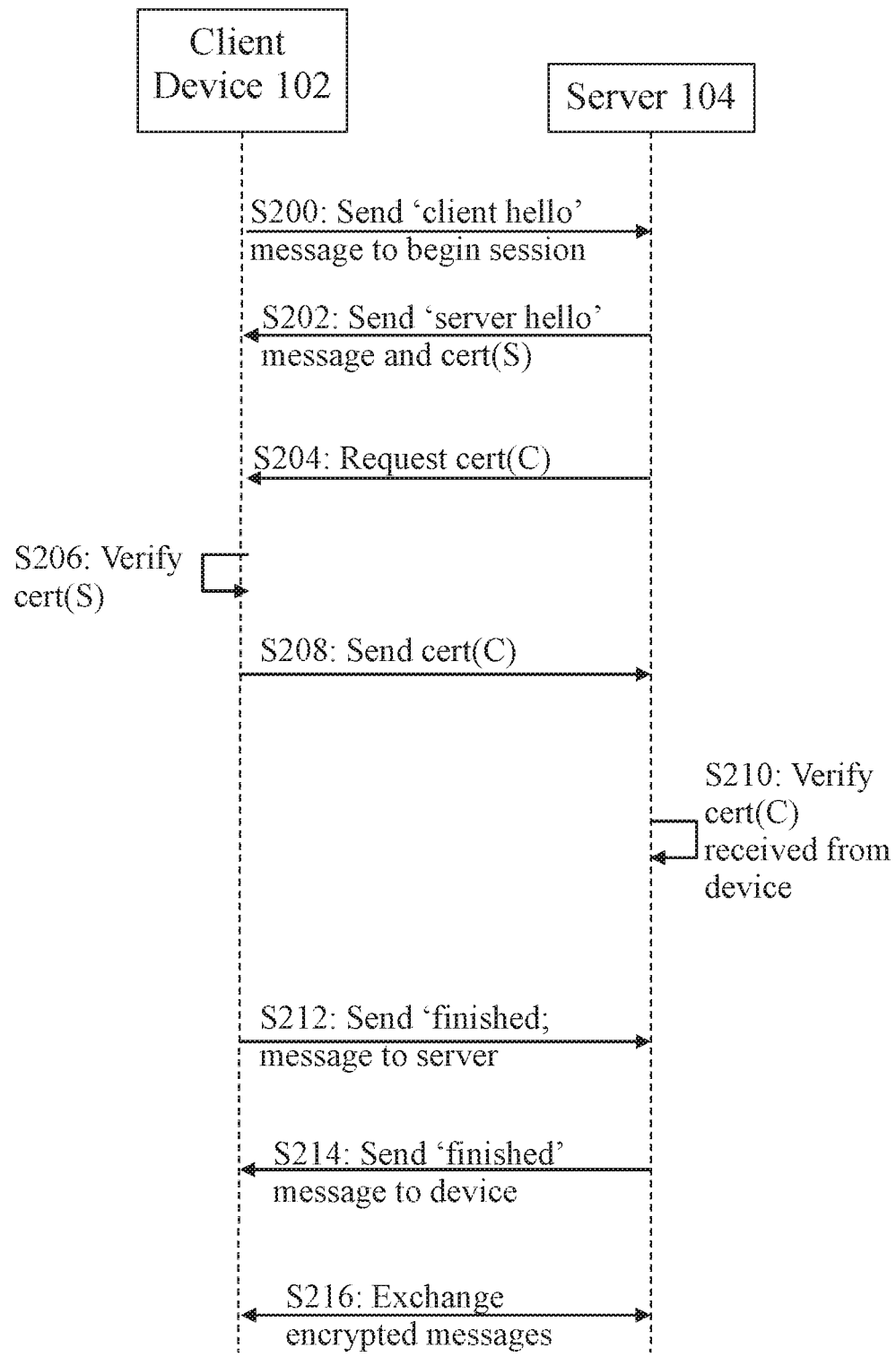
FIG. 2 shows a schematic diagram of steps to perform a handshake between a client device and a server to establish a secure communication session.

FIG. 2 shows a schematic diagram of steps to perform a handshake between a client device and a server to establish a secure communication session. The process begins at step S200 when client device 102 transmits a 'client hello' message (or similar) to server 104. The client device 102 may have been provisioned with the server name indication (SNI) and IP address of the server 104 during a factory bootstrapping process, or by the bootstrap server 106. (It will be understood that the server 104 could equally initiate the handshake by sending the client device 102 the initial 'hello' message, and that the process in FIG. 2 is merely exemplary.) The 'client hello' message may comprise a random byte string that is used in subsequent computations in the handshake process.

At step S202, the server 104 responds by transmitting a 'server hello' message to client device 102. The 'server hello' message may comprise a further random byte string, and its own digital certificate, Cert(S). If the server 104 requires the client device's digital certificate to authenticate the client device 102, then the server 104 also transmits a message requesting Cert(C) (step S204). This request for Cert(C) may be included in the 'server hello' message at step S202.

At step S206, the client device 102 verifies Cert(S) received from server 104. If the verification is unsuccessful, the client device 102 may terminate the process, or send a 'fail' message to the server 104 before terminating the handshake process. If the verification is successful, the client device 102 transmits an encrypted random byte string to server 104 (not shown in FIG. 2). The random byte string is encrypted using the server's public key, and the encrypted random byte string enables both the client device and server to compute the secret key to be used for encrypting subsequent messages exchanged between the machines.

If the server 104 requested Cert(C), at step S208, the client device 102 transmits Cert(C) to server 104. The client device 102 may also transmit a random byte string encrypted with the client device's private key.

At step S210, the server 104 verifies Cert(C) received from client device 102. If the verification is unsuccessful, the server 104 may terminate the process, or send a 'fail' message to the client device 102 before terminating the handshake process.

At step S212, the client device 102 transmits a 'finished' message to server 104, which is encrypted with the secret key. This 'finished' message indicates that the client device 102 part of the handshake process is complete. Similarly, at step S214, the server 104 transmits a 'finished' message to client device 102, which is encrypted with the secret key. This 'finished' message indicates that the server 104 part of the handshake process is complete. The secure communication session has now been established, and the client device 102 and server 104 may exchange messages during the session which are encrypted with the shared secret key (step S216).

As shown in FIG. 2, the handshake process (which may be a TLS/DTLS handshake process or any other handshake process which involves the exchange of security credentials) requires the client device 102 and server 104 to share their digital certificates (see step S202 and S208), and for each machine to verify the received digital certificates. The handshake process necessarily involves at least the server 104 receiving sufficient information from the client device 102 to enable the client device 102 to be identified by the server 104. For example, the handshake messages sent by the client device 102 may comprise information to identify the client device 102, such as a client device identifier. The client device identifier may be contained within the client device certificate Cert(C) or may be separately provided within the handshake messages. The present techniques make use of this to provide a more efficient process for maintaining client device registration with a server.

According to the current description of the LWM2M version 1.0 specification, CoAP messages are used to perform client device registration with a server, for maintaining a registration and performing an update of a registration. While CoAP is a useful communication technique for constrained resource devices and constrained networks, as it uses plain text messages, the combination of CoAP messages and the LWM2M protocol requirement for client devices to maintain their registration with a server results in many CoAP messages being sent every time a client device performs the update operation. Furthermore, the LWM2M protocol does not take into consideration the fact that much information is shared between a client device and a server whenever a secure communication session is established (e.g. using TLS/DTLS), such that the CoAP update messages may, in certain scenarios, be redundant.

Figure 3:
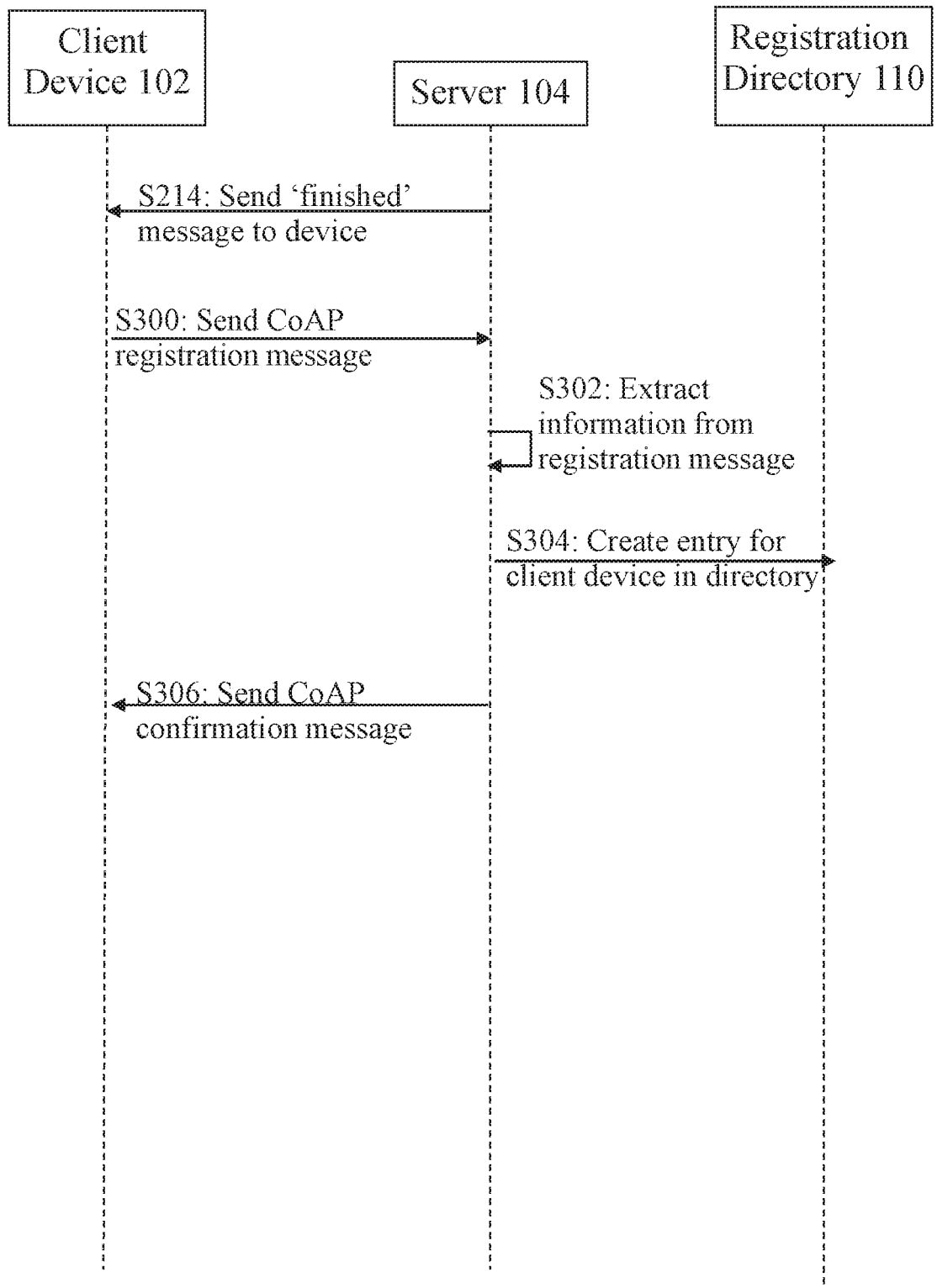
FIG. 3 shows a schematic diagram of steps to register a client device with a server.

FIG. 3 shows a schematic diagram of steps to register a client device with a server. After a secure communication session has been established between client device 102 and server 104 (i.e. following step S214 of FIG. 2), client device 102 sends a CoAP registration message to the server (step S300). The CoAP registration message may be of the form POST/rd?ep=node1&b=UQ<=6000 . . .

which indicates that the client device name (i.e. endpoint name) is "node1", the server must queue all requests to the client device, and that the lifetime of the registration is 6000 seconds. Other parameters may be included in the CoAP registration message, such as an indication of the resources of the client device (e.g. that it measures temperature).

At step S302, the server 104 extracts information/parameters from the CoAP registration message to enable the client device 102 to be added to the registration directory 110. The server 104 then instructs the registration directory 110 (which may be internal or external to the server 104, as shown in FIG. 1) to create an entry for the client device 102 in the client device registration directory 110 (step S304). The client device entry within the registration directory 110 comprises information to enable the server 104 to identify the client device 102, such that subsequent messages received from the client device 102 can be readily attributed to the correct registered device. The client device entry within the registration directory 110 also comprises the lifetime of the registration, so that the server 104 knows how long the current registration is to last, and when to expect an update message from the client device 102 to maintain the registration.

When this has been completed by the registration directory 110, the server sends a CoAP registration confirmation message back to the client device (step S306). The CoAP registration confirmation message may contain a 2.01 (created) response code.

Figure 4:
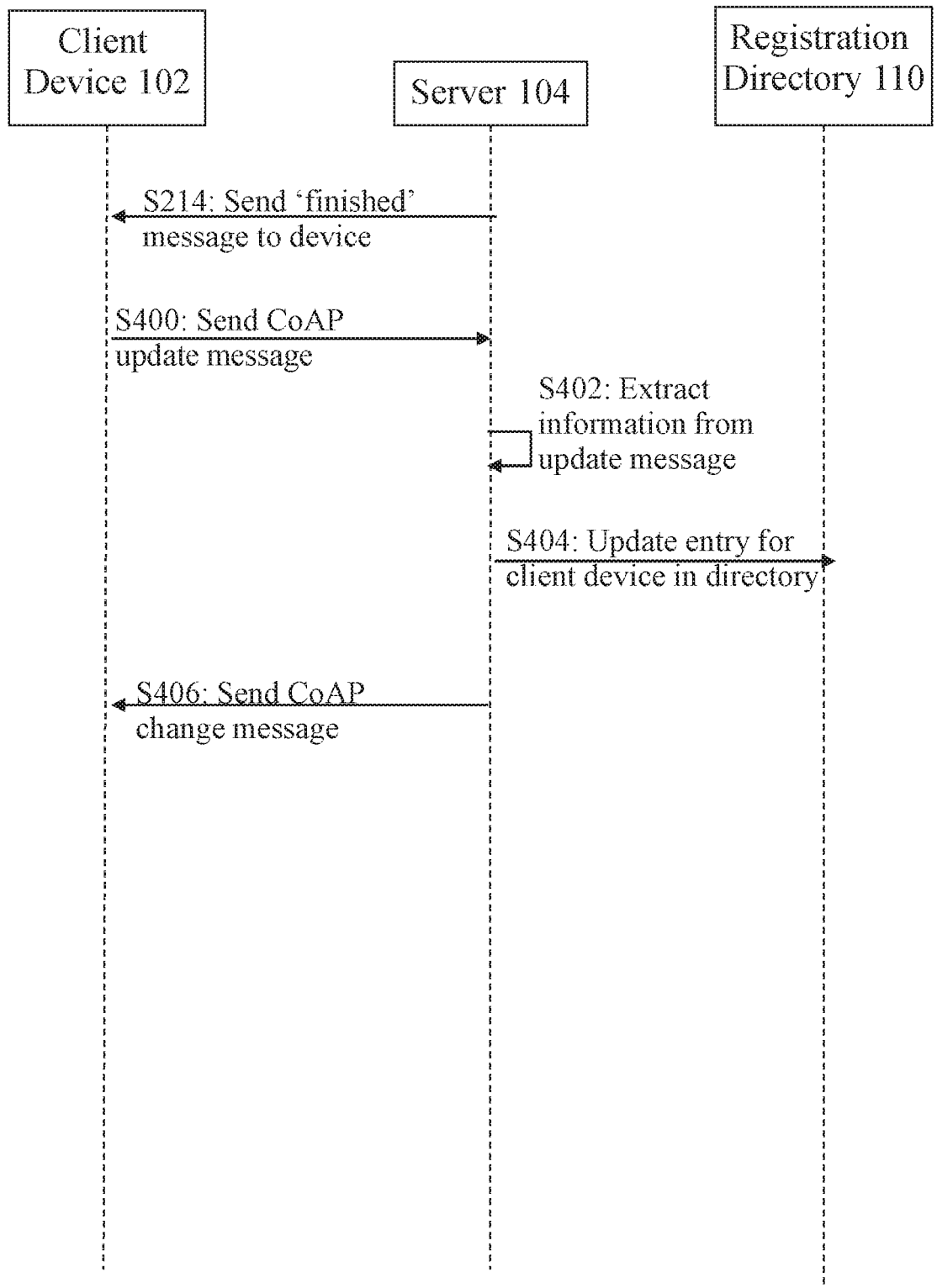
FIG. 4 shows a schematic diagram of steps to maintain a client device registration with a server.

Once a client device 102 has been registered with a server 104, it is necessary for the client device 102 to perform an update operation before expiry of the registration lifetime, in order to maintain the registration with the server 104. FIG. 4 shows a schematic diagram of steps to maintain a client device registration with a server. After a secure communication session has been established between client device 102 and server 104 (i.e. following step S214 of FIG. 2), client device 102 sends a CoAP update message to the server (step S400). The CoAP update message may be of the form POST/rd/{location}?lt=7000 . . .

The message contains sufficient information for the server 104 to identify which client device the message has been received from, and to determine if the client device has an entry within the registration directory 110. The message may contain no parameters, if the only thing the client device 102 wishes to do is maintain the registration, or may contain one or more parameters, if the client device 102 wishes to change or update its entry within the registration directory 110. For example, in the above message the lifetime field in the message indicates the lifetime is now 7000 seconds, and therefore the client device 102 is seeking to update the lifetime within the registration directory 110.

The server 104 extracts information from the CoAP update message (step S402) in order to determine the identity of the client device that sent the message, map the client device identity to an entry within the registration directory 110 (if the client device is registered with the server 104), and update any aspect of the entry within the registration directory 110. The server 104 transmits the extracted information, together with instructions to update the client device entry, to the registration directory 110 (step S404). If the CoAP update message contained no parameters, then the instructions may simply cause the registration directory 110 to maintain the client device 102 entry and/or to restart the lifetime of the registration. When the update process has been completed, the server 104 transmits a CoAP change message back to client device 102 (step 406), where the CoAP change message may contain a 2.04 (changed) response code.

However, as explained above, the process of FIG. 4 to maintain a registration requires a secure communication session to be established and then CoAP messages to be exchanged between a client device 102 and server 104. If the client device 102 simply wishes to maintain its registration with the server 104 (i.e. does not wish to make any changes to its entry within the registration directory 110), then the CoAP update message it sends at step S400 does not contain any parameters. The present techniques provide a technique for maintaining a client device registration (i.e. when no changes to the client device registration are being made), which reduces the number of CoAP messages transmitted between the client device 102 and server 104.

Figure 5:
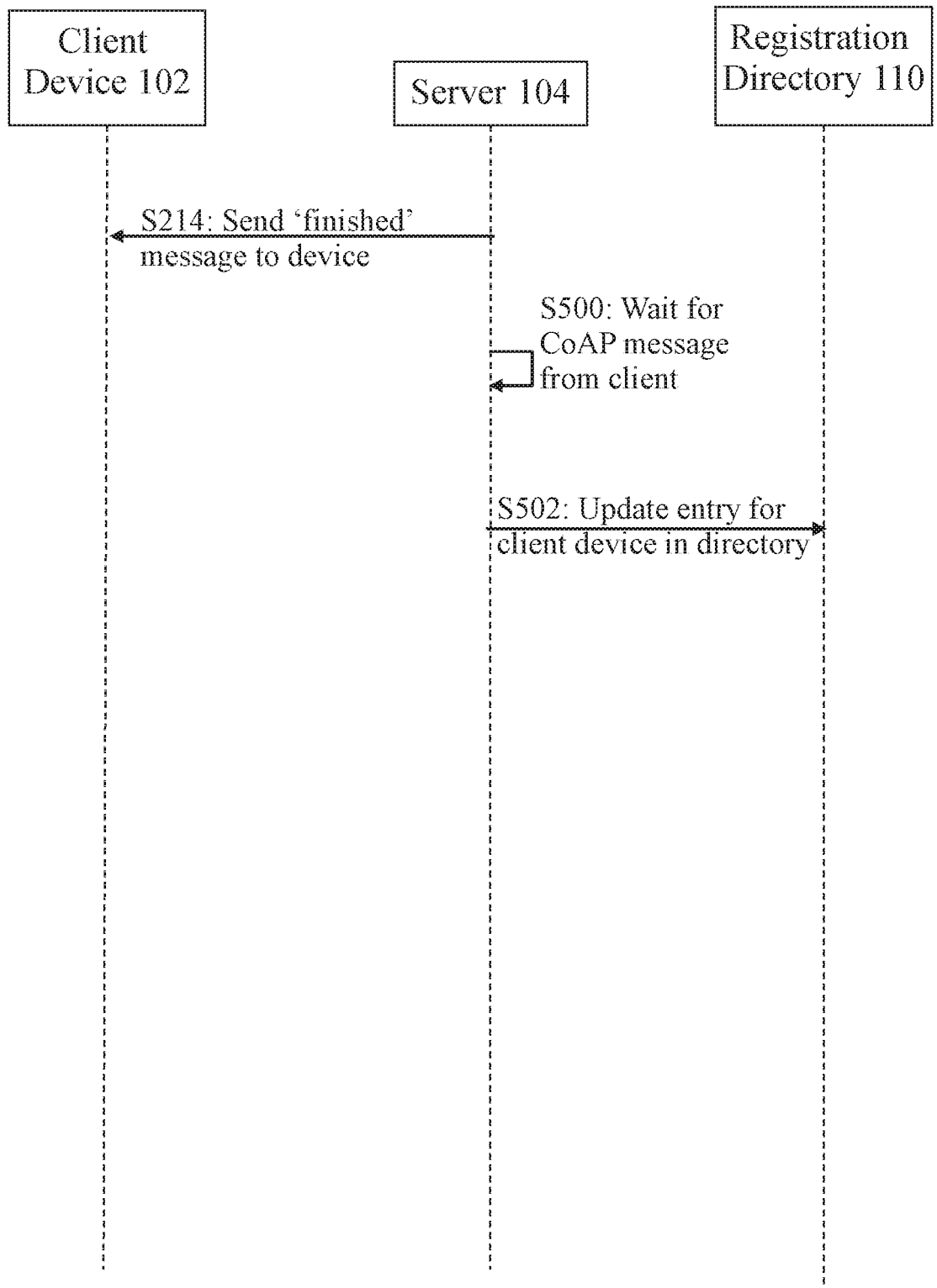
FIG. 5 shows a schematic diagram of a technique to maintain a client device registration with a server.

FIG. 5 shows a schematic diagram of a technique to maintain a client device registration with a server. The process begins by establishing a secure communication session between client device 102 and server 104 (i.e. following step S214 of FIG. 2). Once the secure communication session has been established, the server 104 becomes aware that the client device 102 is still 'alive' and within the server's network. If the client device 102 has no updates to make to its entry within the registration directory 110, the client device 102 may return to a low power mode or a sleep mode. In any case, the client device 102 does not transmit any further message to the server 104. That is, the client device does not send a CoAP update message to the server (c.f. step S400 in FIG. 4). The server 104 may wait for a certain amount of time for a CoAP update message (or other CoAP message) to be sent from the client device 102 which established the secure communication session (step S500). This time may be a few seconds, to tens of seconds, or longer. The time may be defined per server or per network, to take into account how messages are typically transmitted across the network and how many client devices are present in the network. For example, in a multi-hop network, multiple hops may be required for a message to travel from a source to a destination, and therefore the time it takes for a message to be received by server 104 may be longer than in single hop networks where a source may be able to communicate directly with a destination.

In the present techniques, if no CoAP update message (or otherwise) is received by the server 104 during this predetermined time period/duration, the server 104 may conclude that the client device 102 is still 'alive' or operational and wishes to maintain its registration, as otherwise the client device 102 would not have sent the request to establish the secure communication session. Accordingly, the server 104 transmits instructions to the registration directory 110 to maintain the client device 102 entry within the directory (step 502). The server 104 has all the information it needs to identify the correct entry within the directory 110 from the handshake process used to establish the secure communication session. This is because during the handshake process, the client device 102 provides the server 104 with information such as client device name/endpoint name, security credentials, etc. which the server 104 can use to identify the client device 102. This information can be used to locate the client device 102 entry within the registration directory 110. Thus, the present techniques reduce the need for the client device 102 to transmit a CoAP update message (and receive a CoAP changed message) to maintain its registration with server 104. The update process (or process to maintain the registration of a client device with a server) removes some or all redundant CoAP messages, and consequently, provides a simplified and more efficient way to maintain registration of a client device with a server, which may use less power, memory and/or processing power at the client device 102.

Thus, there is provided a method for maintaining registration of a client device 102 with a server 104, the method performed by the client device 102 comprising: establishing a secure communication session with the server 104 comprising sending a client hello message to the server and providing a client device certificate to the server, the client device certificate comprising at least a client device identifier; transmitting, following the establishment of the secure communication session, a Constrained Application Protocol (CoAP) registration message to the server, the CoAP registration message comprising the client device identifier and a lifetime of the registration; receiving a CoAP registration confirmation message from the server confirming that the client device has been added to a client registration directory; sending, before expiry of the lifetime, a further client hello message to the server to maintain registration of the client device within the directory.

The client device 102 may comprise: storage 102*c* for storing one or both of a client device certificate or a hash of the client device certificate, the client device certificate comprising at least a client device identifier; and communication circuitry 102*a* for: establishing a secure communication session with a server, comprising sending a client hello message to the server and providing the client device certificate to the server; transmitting, to the server, a Constrained Application Protocol (CoAP) registration message comprising the client device identifier and a lifetime of the registration; receiving a CoAP registration confirmation message from the server confirming that the client device has been added to a client registration directory; and sending, before expiry of the lifetime, a further client hello message to the server to maintain registration of the client device within the directory.

The client device 102 may comprise processing circuitry 102*b* for switching the device 102 into a sleep mode or a low power mode after receiving the CoAP registration confirmation message from the server 104. This may enable the client device 102 to reduce power consumption, memory usage or processing power. Thus, the method to maintain a registration may comprise entering a sleep mode after receiving the CoAP registration confirmation message. The processing circuitry 102*b* of the client device 102 may switch the device 102 into an awake mode prior to expiry of the registration lifetime, so that the client device 102 can request the establishment of a secure communication session with server 104 before expiry of the lifetime, to maintain its registration with the server 104. Thus, the method to maintain a registration may comprise: entering an awake mode prior to expiry of the lifetime; and re-establishing a secure communication session with the server 104 when sending the further client hello message.

The step of establishing a secure communication session with the server 104 may comprise using a TLS/DTLS handshake sequence, or using any key exchange and handshake process that uses Constrained Application Protocol (CoAP) messages.

Providing a client device certificate may comprise providing a hash of the client digital certificate to the server 104. The hash of the client digital certificate may be generated by applying a cryptographic hash function to the client digital certificate. The cryptographic hash function may be any suitable cryptographic hash function, such as one of: an MD5 hash function; a Secure Hash Algorithm (SHA) hash function; a SHA-2 hash function; a SHA-3 hash function; or a SHA-256 hash function.

The client device 102 and the server 104 may communicate using any suitable communication protocol, such as one of: a lightweight machine-to-machine (LWM2M) protocol, an OMA lightweight machine-to-machine (OMA LWM2M) protocol, an OMA DM specification, an Open Interconnect Consortium (OIC) protocol, a CoAP over TCP standard, a CoAP over TLS standard, or a TR-069 protocol.

The client device 102 may be an Internet of Things (IoT) device.

The server may be any one of: a LWM2M server, an OMA LWM2M server, a TR-069 server, an OIC server, or an OMA DM server.

There is also provided a method for maintaining registration of a client device 102 with a server 104, the method performed by the server 104 comprising: establishing a secure communication session with the client device 102 comprising receiving a client hello message from the client device 102 and a client device certificate, the client device certificate comprising at least a client device identifier; extracting, from the client hello message and client device certificate, information for identifying the client device 102; receiving, following the establishment of the secure communication session, a Constrained Application Protocol (CoAP) registration message from the client device 102, the CoAP registration message comprising the client identifier for the client device 102 and a lifetime of the registration; creating an entry in a client registration directory 110 for the client device 102 using at least the extracted information for identifying the client device and the lifetime of the registration; transmitting a CoAP registration message to the client device 102 confirming that the client device has been added to the client registration directory 110; receiving, before expiry of the lifetime, a further client hello message from the client device 102; using information in the further client hello message to locate the client device entry within the client registration directory 110; and if no subsequent CoAP message is received from the client device 102, using the further client hello message to maintain the registration of the client device within the client registration directory 110.

The server 104 may comprise: at least one processor coupled to communication circuitry for: establishing a secure communication session with a client device 102 comprising receiving a client hello message from the client device and a client device certificate, the client device certificate comprising at least a client device identifier; extracting, from the client hello message and client device certificate, information for identifying the client device; receiving, following the establishment of the secure communication session, a Constrained Application Protocol (CoAP) registration message from the client device, the CoAP registration message comprising the client identifier for the client device and a lifetime of the registration; creating an entry in a client registration directory 110 for the client device using at least the extracted information for identifying the client device and the lifetime of the registration; transmitting a CoAP registration message to the client device confirming that the client device has been added to a client registration directory; receiving, before expiry of the lifetime, a further client hello message from the client device; using information in the further client hello message to locate the client device entry within the client registration directory; and if no subsequent CoAP message is received from the client device, using the further client hello message to maintain the registration of the client device within the client registration directory.

The server 104 may comprise the client registration directory 110. Alternatively, the server 104 may be communicatively coupled to an external client registration directory 110, and the step of creating an entry in a client registration directory 110 comprises sending instructions to the (external) client registration directory 110 to create an entry for the client device 102.

The step of creating an entry in a client registration directory 110 may comprise storing, in the client registration directory 110, at least one of: the client device identifier, a security credential associated with the client device, a hash of the security credential, and a cryptographic hash function used to generate the hash.

The further client hello message may comprise the client device certificate. In this case, the step of using information in the further client hello message may comprise using the client device identifier in the client device certificate to locate the client device entry within the client registration directory 110.

The step of using information in the further client hello message may comprise using a security credential in the further client hello message to locate the client device entry within the client registration directory 110.

The further client hello message may comprise a hash of the security credential. In this case, the step of using information in the further client hello message may comprise: retrieving a security credential and cryptographic hash function pair from the client registration directory; applying the cryptographic hash function to the security credential to generate a hash of the security credential; comparing the generated hash with the received hash (in the further client help message or other message sent by client device 102 during the handshake process); and identifying, if the generated hash matches the received hash, the client device entry within the client registration directory 110. This process may be repeated until a match between the generated hash and the received hash is found.

The security credential may be the client device certificate and/or a TLS credential.

The server 104 may delete the client device entry from the client registration directory 110 if the further client hello message is not received before expiry of the lifetime.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Particular approaches of the present techniques may be embodied and follows:

A first approach of the present techniques provides a method for maintaining registration of a client device with a server, the method performed by the client device comprising: establishing a secure communication session with the server comprising sending a client hello message to the server and providing a client device certificate to the server, the client device certificate comprising at least a client device identifier; transmitting, following the establishment of the secure communication session, a Constrained Application Protocol (CoAP) registration message to the server, the CoAP registration message comprising the client device identifier and a lifetime of the registration; receiving a CoAP registration confirmation message from the server confirming that the client device has been added to a client registration directory; sending, before expiry of the lifetime, a further client hello message to the server to maintain registration of the client device within the directory.

A second approach of the present techniques provides a client device comprising: storage for storing one or both of a client device certificate or a hash of the client device certificate, the client device certificate comprising at least a client device identifier; and communication circuitry for: establishing a secure communication session with a server, comprising sending a client hello message to the server and providing the client device certificate to the server; transmitting, to the server, a Constrained Application Protocol (CoAP) registration message comprising the client device identifier and a lifetime of the registration; receiving a CoAP registration confirmation message from the server confirming that the client device has been added to a client registration directory; and sending, before expiry of the lifetime, a further client hello message to the server to maintain registration of the client device within the directory.

A third approach of the present techniques provides a method for maintaining registration of a client device with a server, the method performed by the server comprising: establishing a secure communication session with the client device comprising receiving a client hello message from the client device and a client device certificate, the client device certificate comprising at least a client device identifier; extracting, from the client hello message and client device certificate, information for identifying the client device; receiving, following the establishment of the secure communication session, a Constrained Application Protocol (CoAP) registration message from the client device, the CoAP registration message comprising the client identifier for the client device and a lifetime of the registration; creating an entry in a client registration directory for the client device using at least the extracted information for identifying the client device and the lifetime of the registration; transmitting a CoAP registration message to the client device confirming that the client device has been added to the client registration directory; receiving, before expiry of the lifetime, a further client hello message from the client device; using information in the further client hello message to locate the client device entry within the client registration directory; and if no subsequent CoAP message is received from the client device, using the further client hello message to maintain the registration of the client device within the client registration directory.

A fourth approach of the present techniques provides a server comprising: at least one processor coupled to communication circuitry for: establishing a secure communication session with a client device comprising receiving a client hello message from the client device and a client device certificate, the client device certificate comprising at least a client device identifier; extracting, from the client hello message and client device certificate, information for identifying the client device; receiving, following the establishment of the secure communication session, a Constrained Application Protocol (CoAP) registration message from the client device, the CoAP registration message comprising the client identifier for the client device and a lifetime of the registration; creating an entry in a client registration directory for the client device using at least the extracted information for identifying the client device and the lifetime of the registration; transmitting a CoAP registration message to the client device confirming that the client device has been added to a client registration directory; receiving, before expiry of the lifetime, a further client hello message from the client device; using information in the further client hello message to locate the client device entry within the client registration directory; and if no subsequent CoAP message is received from the client device, using the further client hello message to maintain the registration of the client device within the client registration directory.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

What is claimed is:

1. A method for maintaining registration of a client device with a Lightweight Machine-to-Machine (LwM2M) server, the method performed by the client device comprising:
   establishing a secure communication session with the LwM2M server comprising performing a Transport Layer Security (TLS) or Datagram Transport Layer security (DTLS) handshake with the LwM2M server;

receiving a registration confirmation message from the LwM2M server confirming that the client device has been added to a client registration directory, the registration having a defined lifetime;

entering a sleep mode after receiving the registration confirmation message;

entering an awake mode prior to expiry of the defined lifetime; and re-establishing a secure communication session with the LwM2M server and initiating, before expiry of the defined lifetime, a further TLS or DTLS handshake with the LwM2M server, where the further TLS or DTLS handshake includes client data used to identify the client device so as to maintain the registration of the client device within the client registration directory.

2. The method as claimed in claim 1, where said establishing a secure communication session with the LwM2M server comprises using a key exchange and handshake process that uses Constrained Application Protocol (CoAP) messages.

3. The method as claimed in claim 1, where said establishing a secure communication session with the LwM2M server includes providing a client device certificate to the LwM2M server and optionally also comprises providing a hash of the client device certificate to the LwM2M server.

4. The method as claimed in claim 3, where the hash of the client device certificate is generated by applying a cryptographic hash function to the client device certificate.

5. The method as claimed in claim 4, where the cryptographic hash function is any one of:
an MD5 hash function;
a Secure Hash Algorithm (SHA) hash function;
a SHA-2 hash function;
a SHA-3 hash function; or
a SHA-256 hash function.

6. The method as claimed in claim 1, where the client data comprises a client device identifier and information about the client device is contained within a handshake message or an identifier extracted from a certificate or a client hello message.

7. The method of claim 1, where the client data comprises any of a Pre-Shared Key, a Session ID or a Session Ticket.

8. The method of claim 1, where said performing the further TLS or DTLS handshake includes sending a certificate message comprising a client certificate and using the client certificate for identifying which client registration to maintain.

9. The method of claim 1, where said performing the further TLS or DTLS handshake includes sending a pre-shared key in a client hello message, the pre-shared key being used for identifying which client device registration to maintain.

10. The method of claim 1, where said performing the further TLS or DTLS handshake includes using information in a client hello message comprising a client identifier in a certificate for locating a client device entry within the client registration directory.

11. The method of claim 1, further comprising using a session resumption with a Session ID or a Session Ticket sent in a client hello message, where the Session ID or Session Ticket is used to identify which client device registration to maintain.

12. A client device comprising:
at least one processor, coupled to communication circuitry, configured to:
establish a secure communication session with a Lightweight Machine-to-Machine (LwM2M) server, including perform a Transport Layer Security (TLS) or Datagram Transport Layer Security (DTLS) handshake with the LwM2M server;
receive a registration confirmation message from the LwM2M server confirming that the client device has been added to a client registration directory, the registration having a defined lifetime; and
initiate, before expiry of the defined lifetime, a further TLS or DTLS handshake with the LwM2M server; and
processing circuitry configured to:
switch the client device into a sleep mode after receiving the registration confirmation message, and
switch the client device into an awake mode prior to expiry of the defined lifetime,
where the further TLS or DTLS handshake includes client data used to identify the client device within the client registration directory and to maintain the registration of the client device within the client registration directory.

13. A non-transitory computer-readable medium storing instructions which, when implemented on a processor, cause the processor to carry out the method of claim 1.

* * * * *